US010218898B2

(12) United States Patent
Bostick et al.

(10) Patent No.: US 10,218,898 B2
(45) Date of Patent: Feb. 26, 2019

(54) AUTOMATED GROUP PHOTOGRAPH COMPOSITION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/260,395

(22) Filed: Sep. 9, 2016

(65) Prior Publication Data

US 2018/0077344 A1 Mar. 15, 2018

(51) Int. Cl.
*H04N 5/232* (2006.01)

(52) U.S. Cl.
CPC ..... *H04N 5/23219* (2013.01); *H04N 5/23222* (2013.01); *H04N 5/23293* (2013.01)

(58) Field of Classification Search
CPC ........... H04N 5/23219; H04N 5/23222; H04N 5/23293
See application file for complete search history.

(56) References Cited

U.S. PATENT DOCUMENTS 6,606,398 B2 8/2003 Cooper
6,608,563 B2 8/2003 Weston et al.
9,210,313 B1\* 12/2015 Svendsen .......... G06F 17/30244
9,286,641 B2 3/2016 Bosworth et al.
2008/0270425 A1 10/2008 Cotgreave
2011/0268323 A1\* 11/2011 Gallagher ......... G06F 17/30265
382/118
2016/0021293 A1 1/2016 Jensen et al.

FOREIGN PATENT DOCUMENTS

WO WO2013095977 A1 6/2013

OTHER PUBLICATIONS

Peter Mell et al, The NIST Definition of Cloud Computing, National Institute of Standards and Technology, Publication 800-145, 2011.

\* cited by examiner

*Primary Examiner* — Twyler L Haskins
*Assistant Examiner* — Carramah J Quiett
(74) *Attorney, Agent, or Firm* — Patrick J. Daugherty; Daugherty & Del Zoppo Co., LPA

(57) ABSTRACT

Aspects identify one or more persons appearing within a photographic image framing of a camera viewfinder. A geographic location is determined for an additional person related to such identified persons, wherein the additional person is located within a specified proximity range to the identified persons but does not appear within the photographic image framing. In response to determining that a relationship of the additional person to a person identified within the image framing indicates that the additional person should be included within photographic images of the identified person, aspects recommend that the additional person be added to the photographic image framing prior to acquisition of image data by the camera from the photographic image framing.

20 Claims, 5 Drawing Sheets

AUTOMATED GROUP PHOTOGRAPH COMPOSITION

BACKGROUND

Cameras and programmable devices that incorporate camera systems (personal digital assistants, smart phones, etc.) enable real-time analysis of captured image data. For example, automated analysis of image information visible to a user via a viewfinder view prior to and during acquisition of a still picture or video stream of images may enable facial detection processes that determine the presence of persons as visible objects within the image data. In some implementations frame markings are superimposed on the identified persons within the image data during acquisition by the camera or the image data, informing the user taking the picture or video of their presence.

Camera systems may prompt user to identify the faces distinguished within image framings, or automatically identify the persons through matching faces to faces of persons identified within photo libraries. The user may then adjust focus, framing, zoom, exposure time or other composition attributes to ensure each person is clearly visible within the viewfinder before the picture or vide is taken (acquired) by the camera. Thus, frame markings failing to appear with respect to one person within a composition may serve as notice to the user that alteration to the composition attributes are needed, wherein the user may manually adjust the focus, framing, zoom, etc., until the camera recognizes and marks that person with the appropriate frame markings.

BRIEF SUMMARY

In one aspect of the present invention, a computerized method for the automatic composition of group photograph framings as a function of relationship data executes steps on a computer processor. One or more persons appearing to a user via a viewfinder of a camera within a photographic image framing for acquisition of image data by the camera are identified. A geographic location is determined for an additional person that is related to one or more of the persons identified within the photographic image framing, wherein the additional person does not appear to the user within the photographic image framing, and the determined geographic location of the additional person is within a specified proximity range to a geographic location of the person(s) identified within the photographic image framing. In response to determining that an attribute of a relationship of the additional person to a person identified within the image framing indicates that the additional person should be included within photographic images of the identified person, aspects recommend that the additional person be added to the photographic image framing prior to acquisition of image data by the camera from the photographic image framing.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies one or more persons appearing to a user via a viewfinder of a camera within a photographic image framing for acquisition of image data by the camera. A geographic location is determined for an additional person that is related to one or more of the persons identified within the photographic image framing, wherein the additional person does not appear to the user within the photographic image framing, and the determined geographic location of the additional person is within a specified proximity range to a geographic location of the person(s) identified within the photographic image framing. In response to determining that an attribute of a relationship of the additional person to a person identified within the image framing indicates that the additional person should be included within photographic images of the identified person, aspects recommend that the additional person be added to the photographic image framing prior to acquisition of image data by the camera from the photographic image framing.

In another aspect, a computer program product for the automatic selection of persons in photographic compositions as a function of relationship data has a computer-readable storage medium with computer readable program code embodied therewith. The computer readable hardware medium is not a transitory signal per se. The computer readable program code includes instructions for execution which cause the processor to identify one or more persons appearing to a user via a viewfinder of a camera within a photographic image framing for acquisition of image data by the camera. A geographic location is determined for an additional person that is related to one or more of the persons identified within the photographic image framing, wherein the additional person does not appear to the user within the photographic image framing, and the determined geographic location of the additional person is within a specified proximity range to a geographic location of the person(s) identified within the photographic image framing. In response to determining that an attribute of a relationship of the additional person to a person identified within the image framing indicates that the additional person should be included within photographic images of the identified person, aspects recommend that the additional person be added to the photographic image framing prior to acquisition of image data by the camera from the photographic image framing.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
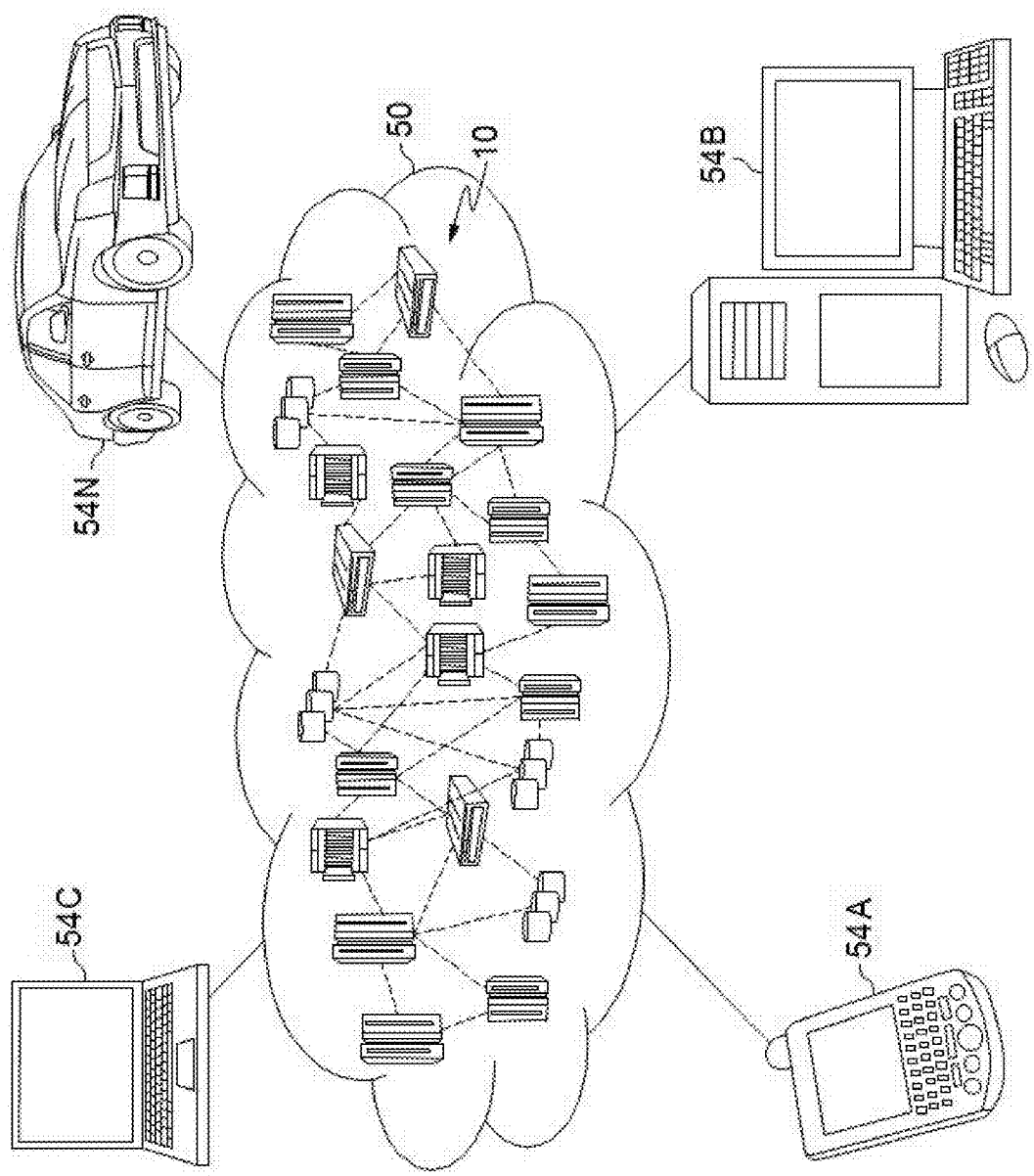
FIG. 1 depicts a cloud computing environment according to an embodiment of the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
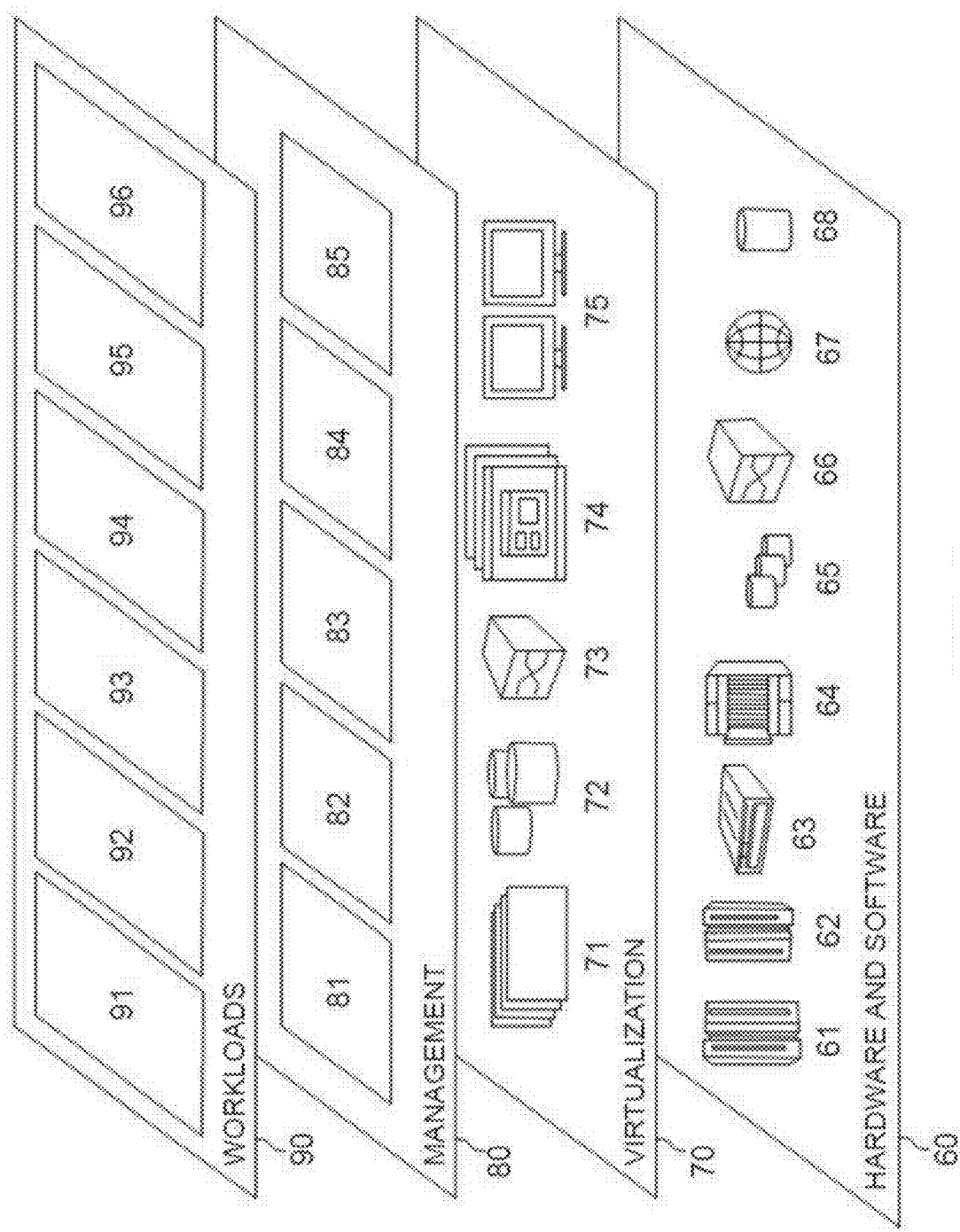
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
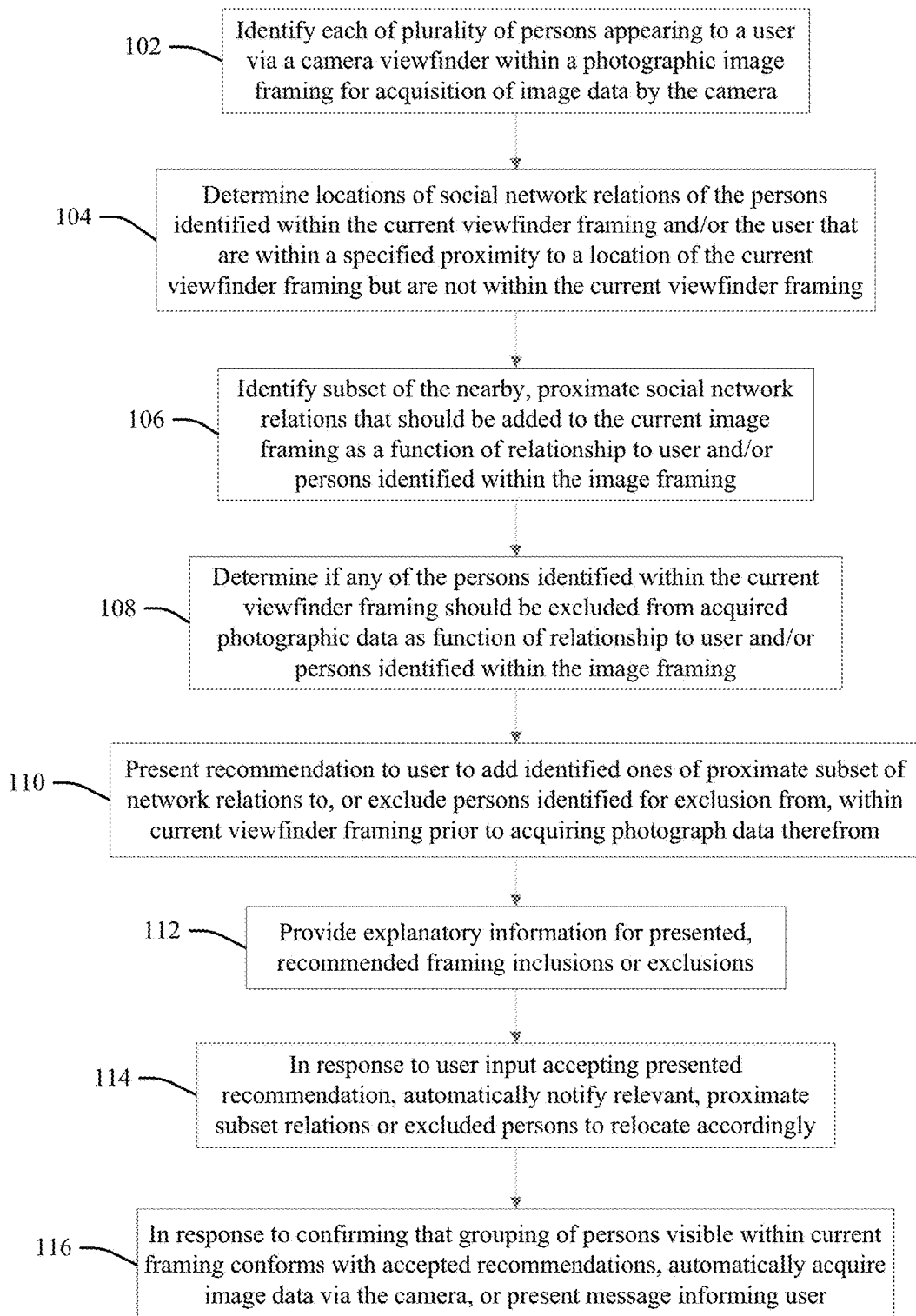
FIG. 4 is a flow chart illustration of a process or system for the automatic selection of persons in photographic compositions as a function of relationship data according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for the automatic selection of persons in photographic compositions as a function of relationship data according to embodiments of the present invention, for example to execute the process steps or system components or tasks as depicted in FIG. 4 below.

Figure 3:
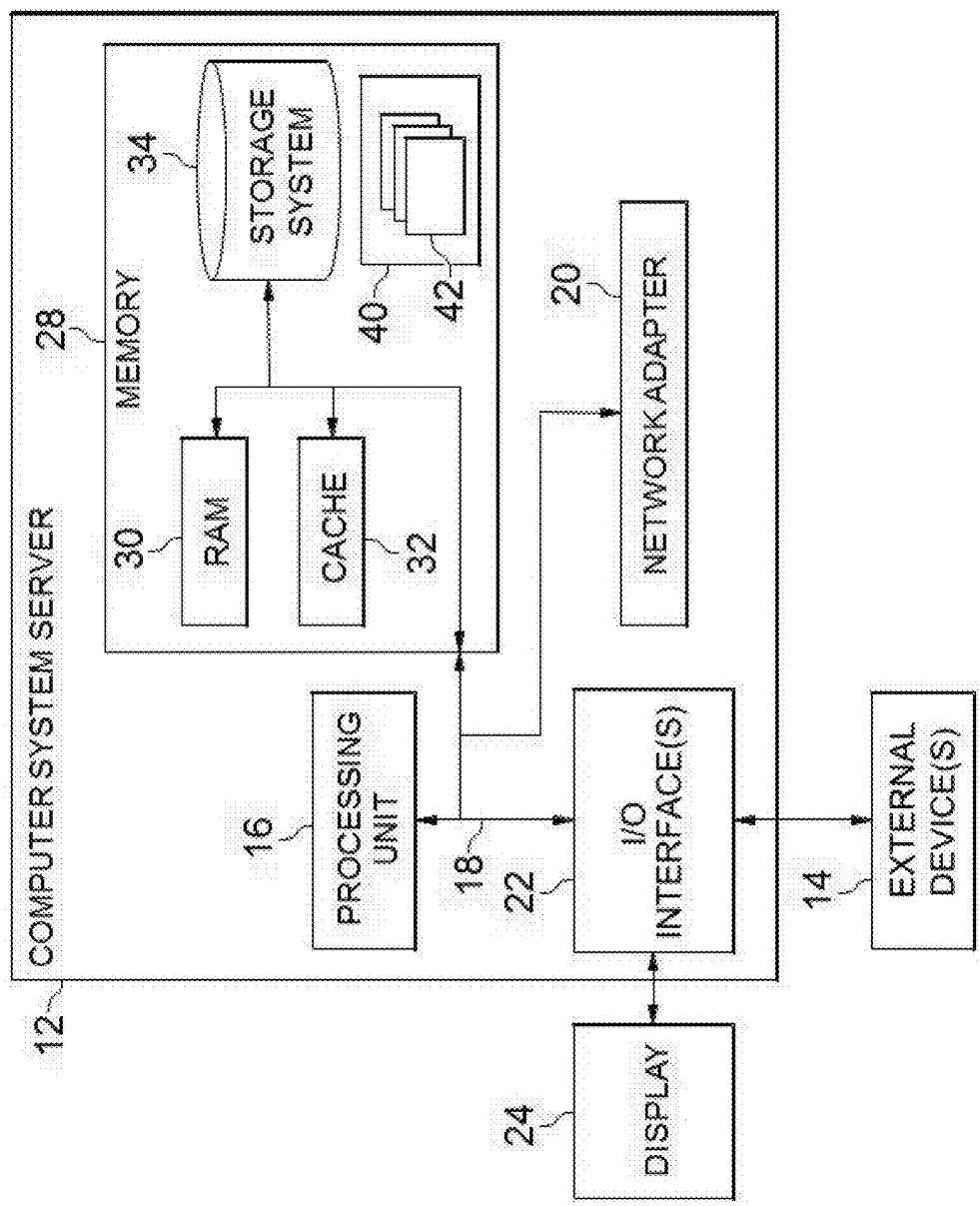
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for the automatic selection of persons in photographic compositions as a function of relationship data. At 102 each of plurality of persons appearing to a user via a viewfinder of a camera device (inclusive of camera applications executing on a programmable device) within a current (live) photographic image framing for acquisition of image data (still picture, video stream of images, etc.) are identified. Generally the identification is through an image analysis of the live image in the viewfinder that locates faces of persons within the framed image through a facial detection process, and then identifies the persons through a facial recognition process.

Facial recognition at 102 may compare the faces located and/or identified with faces tagged in a tagged photo library or other database associated with the user or identified person within the image to look for matches. Tagged photo libraries may be stored locally on the camera/mobile device, on a cloud-based server, on a social network, etc., wherein aspects match located faces with faces of persons tagged in other pictures in the tagged photo library and thereby determined the identity of each matched face in the live viewfinder. Image matching may also incorporate other techniques, including recognizing identifications from voice inputs from a user framing the picture, reading tags or other metadata input by a user, reading identification data broadcast by devices worn by the persons within the image (for example, wireless fidelity (WiFi) or other broadcast data), etc.

At 104 the process or system determines the locations of other persons who are related to the persons identified within the current viewfinder framing, and/or to the user, (hereinafter referred to sometimes as "social network relations") that are within a specified vicinity of (or proximity range to) a location of the persons identified within the photographic image framing, but are not within the frame image. This is accomplished by determining the location of the camera or people framed within the image, using determined global positioning satellite (GPS) coordinate data or other geo-location means, determining the distances to the locations of the other social network relations that are outside of the image framing (and therefore who will not be captured within a photograph acquired from the current image framing), and then identifying a subset of the identified relations that are nearby, within a specified distance or time of travel proximity, to the determined location.

Proximity range values are generally chosen to define locations relative to the framed scene that are close enough to enable such other social network relations to travel to the framed image location and be included within an acquired photograph within a specified or reasonable, projected travel time (for example, ten seconds, thirty seconds, one minute, five minutes, fifteen minutes, etc.) Lesser travel times may limit the inclusion of identified relations to those near enough to be personally addressed and called into the picture, which avoids inconvenience and delay in acquiring a photograph from the current framing. The proximity values may be customized by the user as needed, for example to identify social network relations within 100 meters of the current location, or within 1 kilometer of the current location, etc.

Identifying nearby, proximate social network relations also generally includes eliminating those that are already currently in view, leaving a list of social network relations identified as nearby who are not currently in the frame of the picture.

Aspects may query a variety of location tracking services to determine the location of the social network relations currently outside of the image framing, including those provided by social networks services, mobile operating system (OS) services, cellular service tracking services, etc.

At 106 the process or system identifies one or more (a subset) of the nearby, proximate social network relations that should be added to the current image framing (and thereby to any photograph acquired therefrom) as a function of an attribute of their relationship (or other relevance) to persons identified within the image framing at 102 (and/or to the user). The following are illustrative but not exhaustive attribute factors considered in relationship and relevance analysis at 106:

(a.) Relationship to participants. A defined relationship of the persons identified within the image viewfinder framing to each other, and optionally to the user operating the camera, is identified utilizing a tagged photo library, social network or other data. For example, the process or system may determine that a social network service identifies two of the persons within the image framing as siblings, and responsively identify other siblings, or family members, of the nearby, proximate social network relations as subset relations that (likely) should be added to the current image framing, and thereby to any photograph acquired therefrom.

(b.) Common demographic theme. Using image analysis a common demographic theme (age or range of ages, retirement status, school alumni status, etc.) may be identified at 106. For example, aspects may determine that the only persons within the current image framing are children, and responsively identify (or limit) the subset of the proximate social network relations recommended for addition to the current framing as (to) children (that each has an age within a range of ages indicative of children of a subset thereof (kindergarteners, third graders, etc.).

(c.) Historical grouping trends. By analyzing previous photographs aspects may identify grouping trends, for example determining that whenever Persons A and B are in a photograph, in 80% of historical photographs Person C is also included. If the 80% frequency meets or exceeds a threshold minimum frequency indicative of a prevailing trend, then in response to determining that Persons A and B are currently in the frame of the shot but Person C is not, Person C is included within the subset of proximate social network relations defined for suggestion for addition to the current framing.

(d.) Historical grouping by location. Aspects may analyze historical data for previous photographs to identify trends related to location. For example, an aspect may determine (recognize) that each of a group of persons within the current framing are tagged as hikers, related to each other by taking part in hiking activities, or otherwise identified as belonging to or associated with group hiking activities within a social network service. In response to determining that said group of hikers are in a current photograph image framing in a location identified as including hiking trails (for example, geo-located within a national park or on a hiking trail), and that hiker C is included in 80% of historical photographs taken of hikers A and B within hiking locations, hiker C is identified within the suggested, relevant subset of proximate relations for inclusion within the current framing.

(e.) Identification of people missing from the photograph who are not nearby, and therefore not amenable to inclusion within the subset of suggested additions to the current framing. In addition to determining which nearby friends, contacts or other social network relations are appropriate to include in a group photograph, aspects may determine the location of social network relations that are appropriate to add to the current framing or as otherwise related to the photograph, but which are not in the vicinity and thus cannot be reasonably added to the current framing prior to acquiring photographs therefrom. For example, using historical grouping trends aspects may determine that in photographs of a group of three people in a current framing a certain fourth person is also included 80% of the time, but this fourth person is not in the vicinity. Aspects may responsively determine that said fourth person is likely to be interested in seeing the photograph, and automatically send a copy of the photograph to him or her after it has been taken.

(f.) Global subset list of all social network relations outside of the current framing ordered or sorted by distance. Some aspects may also locate all social network relations currently outside of the image framing, and present them to the user in a descending list of proximity and/or importance parameter values. They may be ordered with respect to relative proximity to the camera or frame image scene, wherein a user may identify and determine a nearby subset or group of the identified relations based on other, real-time parameters. Thus, if the user wants to quickly acquire a picture from the current framing, the user may limit those considered proximate to persons within the immediate vicinity that can quickly enter the framing. Alternatively; if one of listed relations presented to the user is a five minute drive or bicycle ride away, and the user wants to include the person in the photograph, the user may choose to effectively ignore a current proximity value that might otherwise exclude this person from being considered "nearby," and delay the photograph in response to notifying the desired relation (by a phone call, text message, etc.) to come to the framing location, in some example in response to a reply confirming that the person is on their way by an appropriate (fast enough) conveyance to the framing location.

(g.) Dynamic proximity value definitions. Aspects may enable a user to dynamically define proximity values to expand or shrink proximity-based selections of social network relations for inclusion in the current framing as needed or desired. These aspects provide for the identification of other social network relations that may not be proximate, giving the user the option to delay the photograph acquisition long enough to enable certain desired people to be summoned to come to the image framing location, even though they may be far away. The social network relations identified as outside of the current framing may also be organized by some other criteria, for example by rate of detected motion, thereby distinguishing people moving or stationary, or those moving at speeds indicating location in or on a moving vehicle and thereby more able to timely travel to and arrive at the current camera location, etc.

(h.) Selection or ordering may be based on importance. For example, with respect to a group of co-workers identified in a current framing, aspects may locate their boss and add her to the subset of suggested additions to the framing independent of actual proximity of the boss, or automatically send a copy of the picture if not proximate enough to be added to the framing in a timely fashion, etc.

At 108 aspects may also determine if any of the persons identified within the current viewfinder framing should be excluded from an acquired photograph. For example, consider a politician identified within a current group photograph framing. Aspects may determine that another person identified within the current framing that includes the politician is associated with an issue, a special interest group, or a historical activity that the politician does not wish to be identified with, and therefore that this person should likely be excluded from the current viewfinder framing prior to acquisition of picture data.

At 110 aspects present recommendations (suggestions) to the user to add identified ones of the proximate subset of the social network relations to the current framing, or to exclude persons identified for exclusion at 108 from within the current viewfinder framing, prior to acquiring photograph data therefrom. Generally the recommendations are displayed to the user as text content messages within the viewfinder display, though other notification techniques may be used, including audio prompts, text messaging to the user and/or the subset of proximate relations recommended for addition to the current framing, etc.

At 112 aspects optionally provide details or other explanatory information for the presented, recommended inclusions or exclusions to the current framing. In one aspect a user selection of a recommendation display within the viewfinder (for example, via a finger tap selection on the presented notification that is recognized as a query input through a touch screen viewfinder) evokes a pop-up window explaining the relationship forming the basis of the recommendation. For example, selection of a recommendation to add Person X presented at 110 may evoke a pop-up window explaining that Person X is the brother of Persons' A and B that are presently within the current framing; or selection of a recommendation to exclude Person Y presented at 110 may evoke a pop-up window explaining that Person Y is a member of a special interest group funding opponents of the party of Politician D located within the current framing.

At 114, in response to an input from the user accepting a presented recommendation, aspects may automatically notify the relevant, proximate subset relations or excluded persons to relocate accordingly; for example, by sending a text message or other communication to one of the proximate subset relations to ask that they join the current framing, or to request that someone marked for exclusion at 110 exit the framing. The text notifications may provide a variety of additional information, including who is in the current framing, a location to transit to in order to locate within the current framing, and a reason why the notified person is identified as appropriate for addition to the photograph framing, for example, "Please come now to the entrance to Exhibit X and stand next to your brother Jeff for a family picture." In place of sending notifications, the user may also elect to simply call out to proximately located relations that are nearby, verbally requesting that they move to a designated location to be included in a picture, or to request that someone marked for exclusion exit the framing, wherein such aspects leave the option of notifying the identified persons within the choice and discretion of the user.

At 116, in response to confirming that a grouping of persons visible within the current framing conforms with the accepted recommendations (that the suggested additions from the proximate subset relations are now within the current framing, or that persons recommended for exclusion are no longer visible within the current framing), aspects automatically take a photograph or otherwise acquire image data via the camera, or alternatively present a message informing the user that all desired participants are now present within the framing and prompting the user to take the photograph or start acquiring video data. The processes of 116 may be triggered immediately upon determining that additional people have entered the current frame of the live viewfinder and identifying them as proximate relations recommended for addition and confirmed by the user, or upon determining that people identified as to-be-excluded (as confirmed by the user) have left the current frame of the live viewfinder.

Figure 5:
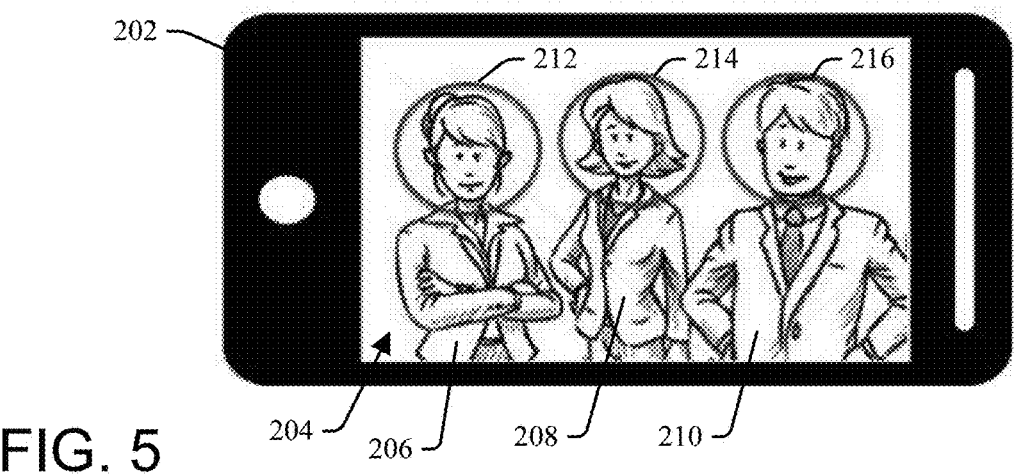
FIG. 5 is a graphic illustration of an implementation of an aspect of the present invention.

FIG. 5 is a graphic illustration of a smart phone 202 configured to execute according to the process of FIG. 4 described above. The phone 202 has a touch screen display 204 driven by a camera application executing on a processing unit of the smart phone to function as viewfinder and thereby display a current (live) photograph framing to a user as camera application operator for acquisition of a still picture or video stream of images. Via image analysis of the live image the present aspect determines that three different persons 206, 208 and 210 are visible within the displayed framing, locates their respective faces 212, 214 and 216, and identifies (for example, via comparison and matching to faces tagged in a tagged photo library) person 214 as "Jane Jones" and person 216 as "John Jones".

Figure 6:
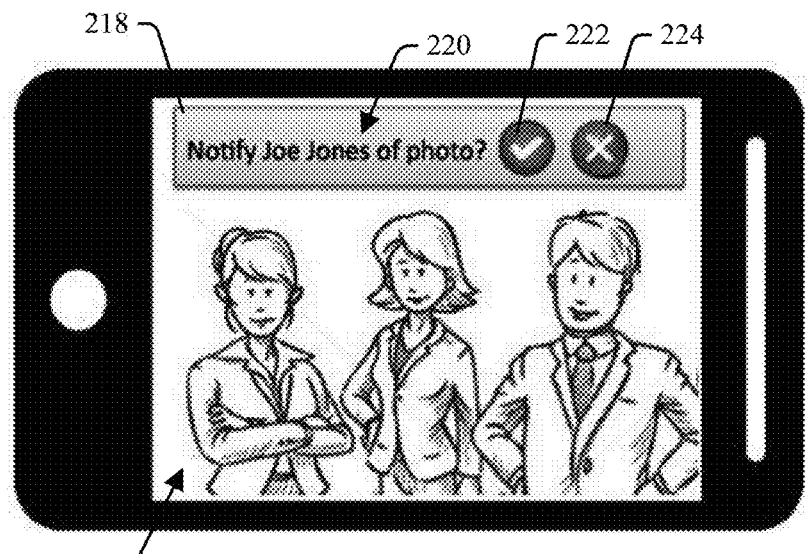
FIG. 6 is a graphic illustration of an implementation of an aspect of the present invention.

FIG. 6 illustrates an output of the processes of FIG. 4, wherein the aspect determines that Jane Jones 214 and John Jones 216 are siblings; that Joe Jones is a sibling of Jane Jones 214 and John Jones 216; that Joe Jones is presently located within a specified proximity to a determined geo-located location of the image (defined by GPS coordinates of the smart phone 202) but is not within the frame image; and that Joe Jones is included in 80% of applicable historical pictures that include both Jane Jones 214 and John Jones 216 (for example, of all pictures taken by the current user, and/or when taken by the user in a park area and the current GPS coordinates of the smart phone are within a national park). In response to one or more of the above determinations the present aspect drives the display 204 to display a pop-up window 218 that comprises a text message 220 that informs the user of the identity ("Joe Jones") as another person not within the current framing but identified as proximate to the location of the framed image and likely to be included within a photograph acquired by the user from the current framing, and queries the user as to whether Joe Jones should be notified to join the current framing prior to taking a picture. The display 204 is further driven to provide yes/no option to send a notification to this person for selection by the user (via a touch screen input): an affirmative radio button 222 that confirms that Joe should be notified to join the framing within the view, and a cancel radio button 224 that cancels the prompted invitation process.

Figure 7:
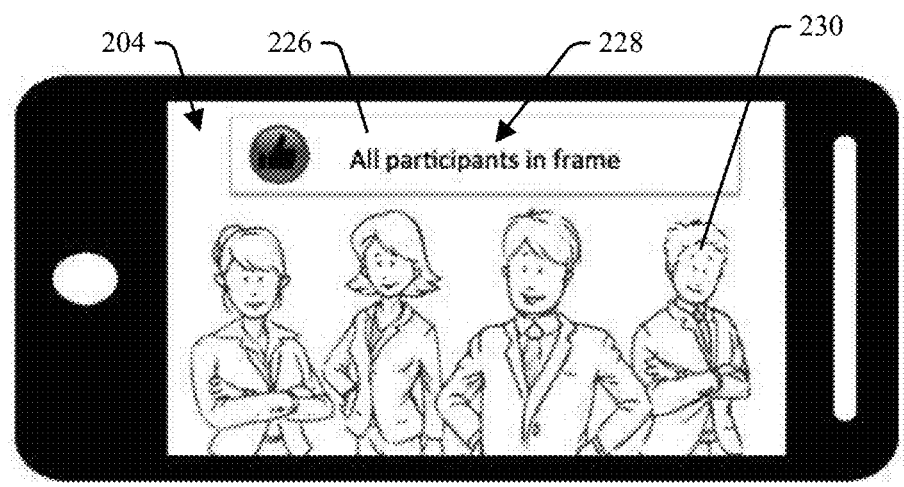
FIG. 7 is a graphic illustration of an implementation of an aspect of the present invention.

In response to selection of the affirmative radio button 222 by the user, the aspect invites Joe to join the image framing. FIG. 7 illustrates a pop-up window 226 that comprises a text message 228 that informs the user of that all recommended additions (inclusive of Joe Jones) are now within the framing, in response to determining that another person 230 now within the frame is the missing Joe Jones (via matching the face of Joe Jones to a face tagged in a tagged photo library, or in response to an affirmative input from the user indicating that the new person is Joe Jones, or to a unique identification signal received from a smart phone or other wireless transmitting device worn by Joe Jones, or to some other input or determination).

As discussed in the Background of the Invention, the prior art provides for cameras and programmable device camera systems that determine the presence of persons as visible objects within the image data via real-time analysis of captured image data. However, while such teachings are capable of identifying the names of the people being framed in a photograph via facial detection mechanisms, the prior art teachings provide no real-time guidance as to who should be framed in a particular photograph relative other persons prior to capture of the image, and thus who should be added or subtracted from the image framing prior to image data acquisition.

Aspects of the present invention maximize the ability of users to include or exclude relevant participants, via automated process that determine in the background, without requiring attention or active participation of the user, who should participate in a particular group photograph, and if those participants are nearby, to request their presence in a photograph. Thus, in taking pictures at a family picnic, when a photograph is being taken of only two siblings, and a third sibling is nearby, aspects enable prompt notification of the user and the missing sibling in order to efficiently ensure that all of the siblings are included in the photograph.

In some implementations, frame markings superimposed on the identified persons within the image data during acquisition by the camera or the image data may be used by the user to re-frame the image to include or exclude persons as desired. The user may then adjust focus, framing, zoom, exposure time or other composition attributes to ensure each person is clearly visible within the viewfinder before the picture or video is taken (acquired) by the camera. Thus, frame markings failing to appear with respect to one person within a composition may serve as notice to the user that alteration to one or more of the composition attributes is needed, wherein the user may manually adjust the focus, framing, zoom, etc., until the camera recognizes and marks that person with the appropriate frame markings.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for the automatic composition of group photograph framings as a function of relationship data, comprising executing on a computer processor:
identifying a person appearing to a user via a viewfinder of a camera within a photographic image framing for acquisition of image data by the camera;
determining a geographic location of an additional person who is related to the person identified within the photographic image framing, wherein the additional person does not appear to the user within the photographic image framing, and the determined geographic location of the additional person is within a specified proximity range to a geographic location of the person identified within the photographic image framing; and
in response to determining that a relationship of the additional person to the person identified within the image framing indicates that the additional person should be included within photographic images of the identified person, recommending that the additional person be added to the photographic image framing prior to acquisition of image data by the camera from the photographic image framing.

2. The method of claim 1, wherein the determining that the relationship of the additional person to the person identified within the image framing indicates that the additional person should be included within photographic images of the identified person is selected from the group consisting of:
identifying that the additional person is related by family to the person identified within the image framing; and
identifying that the additional person and the person identified within the image framing each have ages within a specified age range.

3. The method of claim 1, wherein the recommending that the additional person be added to the photographic image framing is selected from the group consisting of displaying a text content message to the user via a display of the viewfinder, generating an audio prompt to the user, sending a text message to the user, and sending a text message to the additional person.

4. The method of claim 1, further comprising:
defining the specified proximity range as a function of projected travel time for relocation of the additional person to the geographic location of the person identified within the photographic image framing.

5. The method of claim 1, wherein the person identified within the photographic image framing is one of a plurality of persons that are each identified within the photographic image framing, the method further comprising:
in response to determining that an attribute of a relationship between first and second persons of the persons identified within the image framing indicates that the first person should be excluded from photographic image data that includes the second person, recommending removal of the first person from the photographic image framing prior to acquisition of image data by the camera from the photographic image framing.

6. The method of claim 1, wherein the determining that the relationship of the additional person to the person identified within the image framing indicates that the additional person should be included within photographic images of the identified person comprises:
determining that the additional person appears with the person identified within the image framing within a threshold frequency percentage of historic picture data.

7. The method of claim 6, wherein the historic picture data is acquired from locations associated with an activity that is associated with the geographic location of the person identified within the photographic image framing.

8. The method of claim 1, further comprising:
integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the identifying the person appearing to the user via the camera viewfinder within the photographic image framing for acquisition of image data by the camera, determining the geographic location of the additional person, and recommending that the additional person be added to the photographic image framing prior to acquisition of image data by the camera from the photographic image framing in response to determining that the relationship of the additional person to the person identified within the image framing indicates that the additional person should be included within photographic images of the identified person.

9. The method of claim 8, wherein the computer-readable program code is provided as a service in a cloud environment.

10. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
identifies a person appearing to a user via a viewfinder of a camera within a photographic image framing for acquisition of image data by the camera;
determines a geographic location of an additional person who is related to the person identified within the photographic image framing, wherein the additional person does not appear to the user within the photographic image framing, and the determined geographic location of the additional person is within a specified proximity range to a geographic location of the person identified within the photographic image framing; and
in response to determining that a relationship of the additional person to the person identified within the image framing indicates that the additional person should be included within photographic images of the identified person, recommends that the additional person be added to the photographic image framing prior to acquisition of image data by the camera from the photographic image framing.

11. The system of claim 10, wherein the processor executes the program instructions stored on the computer-readable storage medium via the computer readable memory and thereby determines that the relationship of the additional person to the person identified within the image framing indicates that the additional person should be included within photographic images of the identified person by a determination selected from the group consisting of:

identifying that the additional person is related by family to the person identified within the image framing; and identifying that the additional person and the person identified within the image framing each have ages within a specified age range.

12. The system of claim 10, wherein the processor executes the program instructions stored on the computer-readable storage medium via the computer readable memory and thereby recommends that the additional person be added to the photographic image framing via an action selected from the group consisting of displaying a text content message to the user via a display of the viewfinder, generating an audio prompt to the user, sending a text message to the user, and sending a text message to the additional person.

13. The system of claim 10, wherein the processor executes the program instructions stored on the computer-readable storage medium via the computer readable memory and thereby defines the specified proximity range as a function of projected travel time for relocation of the additional person to the geographic location of the person identified within the photographic image framing.

14. The system of claim 10, wherein the processor executes the program instructions stored on the computer-readable storage medium via the computer readable memory and thereby determines that the relationship of the additional person to the person identified within the image framing indicates that the additional person should be included within photographic images of the identified person by determining that the additional person appears with the person identified within the image framing within a threshold frequency percentage of historic picture data.

15. The system of claim 14, wherein the historic picture data is acquired from locations associated with an activity that is associated with the geographic location of the person identified within the photographic image framing.

16. A computer program product for the automatic composition of group photograph framings as a function of relationship data, the computer program product comprising:

a computer readable storage medium having computer readable program code embodied therewith, wherein the computer readable storage medium is not a transitory signal per se, the computer readable program code comprising instructions for execution by a processor that cause the processor to:

identify a person appearing to a user via a viewfinder of a camera within a photographic image framing for acquisition of image data by the camera;

determine a geographic location of an additional person who is related to the person identified within the photographic image framing, wherein the additional person does not appear to the user within the photographic image framing, and the determined geographic location of the additional person is within a specified proximity range to a geographic location of the person identified within the photographic image framing; and in response to determining that a relationship of the additional person to the person identified within the image framing indicates that the additional person should be included within photographic images of the identified person, recommend that the additional person be added to the photographic image framing prior to acquisition of image data by the camera from the photographic image framing.

17. The computer program product of claim 16, wherein the computer readable program code comprises instructions for execution by the processor that cause the processor to determine that the relationship of the additional person to the person identified within the image framing indicates that the additional person should be included within photographic images of the identified person by a determination selected from the group consisting of:

identifying that the additional person is related by family to the person identified within the image framing; and identifying that the additional person and the person identified within the image framing each have ages within a specified age range.

18. The computer program product of claim 16, wherein the computer readable program code comprises instructions for execution by the processor that cause the processor to recommend that the additional person be added to the photographic image framing via an action selected from the group consisting of displaying a text content message to the user via a display of the viewfinder, generating an audio prompt to the user, sending a text message to the user, and sending a text message to the additional person.

19. The computer program product of claim 16, wherein the computer readable program code comprises instructions for execution by the processor that cause the processor to define the specified proximity range as a function of projected travel time for relocation of the additional person to the geographic location of the person identified within the photographic image framing.

20. The computer program product of claim 16, wherein the computer readable program code comprises instructions for execution by the processor that cause the processor to determine that the relationship of the additional person to the person identified within the image framing indicates that the additional person should be included within photographic images of the identified person by determining that the additional person appears with the person identified within the image framing within a threshold frequency percentage of historic picture data.

* * * * *